US008327553B2

(12) United States Patent
Matzker et al.

(10) Patent No.: US 8,327,553 B2
(45) Date of Patent: Dec. 11, 2012

(54) DEVICE AND METHOD FOR DETERMINING VERTICAL POSITIONS

(75) Inventors: Klaus Matzker, Remscheid (DE); Ingo Mönch, Kerrisdale (SG); Markus Staszewski, Oberhausen (DE)

(73) Assignee: Fraba AG, Cologne (DE)

( * ) Notice: Subject to any disclaimer, the term of this patent is extended or adjusted under 35 U.S.C. 154(b) by 621 days.

(21) Appl. No.: 12/373,811

(22) PCT Filed: Jul. 18, 2007

(86) PCT No.: PCT/EP2007/057426
§ 371 (c)(1),
(2), (4) Date: Dec. 7, 2009

(87) PCT Pub. No.: WO2008/009703
PCT Pub. Date: Jan. 24, 2008

(65) Prior Publication Data
US 2010/0088908 A1    Apr. 15, 2010

(30) Foreign Application Priority Data
Jul. 18, 2006 (DE) .................. 10 2006 033 605

(51) Int. Cl.
*G01C 5/06* (2006.01)
*B66B 3/02* (2006.01)
(52) U.S. Cl. ............................. 33/367; 187/394
(58) Field of Classification Search ............ 33/367; 187/391, 393, 397; 701/300, 408, 519; 702/138, 702/166
See application file for complete search history.

(56) References Cited

U.S. PATENT DOCUMENTS

| 4,874,063 | A  | * | 10/1989 | Taylor ........................ 187/391 |
| 5,224,059 | A  | * | 6/1993  | Nitta et al. ...................... 73/384 |
| 5,652,592 | A  | * | 7/1997  | Sanderford et al. ......... 342/385 |
| 7,162,368 | B2 | * | 1/2007  | Levi et al. ..................... 701/300 |
| 7,353,916 | B2 | * | 4/2008  | Angst ........................... 187/393 |
| 2002/0104716 | A1 | * | 8/2002 | Zaharia ........................ 187/394 |
| 2002/0117359 | A1 | * | 8/2002 | Vecchiotti et al. ........... 187/393 |
| 2003/0136191 | A1 | * | 7/2003 | Tsuji ............................. 73/384 |
| 2005/0176441 | A1 | * | 8/2005 | Jurecka ...................... 455/456.1 |
| 2007/0093962 | A1 | * | 4/2007 | Swope et al. ................ 701/220 |
| 2009/0286556 | A1 | * | 11/2009 | Yumoto et al. ............ 455/456.6 |

FOREIGN PATENT DOCUMENTS

CN    102009883 A * 4/2011

(Continued)

*Primary Examiner* — R. A. Smith
(74) *Attorney, Agent, or Firm* — Norman B. Thot

(57) ABSTRACT

The invention relates to a device and a method for determining the vertical spacing of objects while carrying out positioning tasks with a vertical travel portion. The object of providing a device and a method for determining the vertical spacing of objects while carrying out positioning tasks with a vertical travel portion, which, or with which, respectively, a vertical spacing determination can easily be carried out even after a power failure with a low outlay for apparatus, is achieved by a device for vertical spacing determination in that at least a first pressure sensor (4) is arranged on a first object (1) and at least a second pressure sensor (5) is arranged on a second object (2) and evaluation means are provided, the objects (1, 2) changing their vertical position relative to one another while the positioning is being carried out and the vertical travel portion between the positions of the objects (1, 2) being determinable by the evaluation means from the difference of the measured pressure values of the first and second pressure sensor (4, 5).

12 Claims, 1 Drawing Sheet

FOREIGN PATENT DOCUMENTS

| | | |
|---|---|---|
| DE | 615198 C | 6/1935 |
| DE | 9116466 U1 | 12/1992 |
| DE | 29504463 U1 | 5/1995 |
| DE | 10259037 A1 | 7/2004 |
| EP | 1115241 A2 | 7/2001 |
| EP | 1154231 A1 | 11/2001 |

* cited by examiner

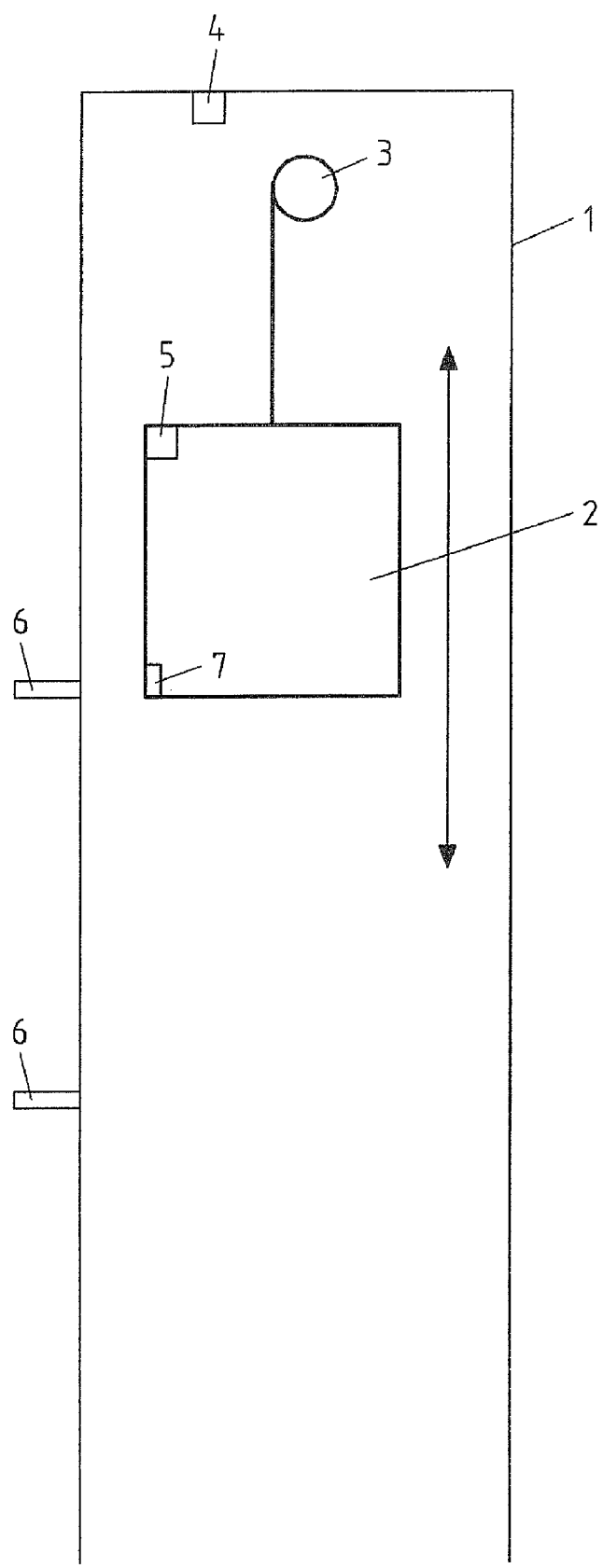

DEVICE AND METHOD FOR DETERMINING VERTICAL POSITIONS

CROSS REFERENCE TO RELATED APPLICATION:

This is a National Stage of International Application PCT/EP2007/057426, filed 18 Jul. 2007, which claims the benefit of Application No. 10 2006 033 605.4, filed in Germany on 18 Jul. 2006, the disclosures of which Applications are incorporated by reference herein.

The invention relates to a device and a method for determining the vertical spacing of objects while carrying out positioning tasks with a vertical travel portion. A typical positioning task with a vertical travel portion is, for example, the positioning of the lift car of a lift in the lift shaft. Lifts generally have to be positioned virtually within millimeter precision so as not to produce any entry edges or steps at the transition to the floor of the respective storey. The control of the lift in particular has to recognize on which storey the lift is located to control it in accordance with the control command of the user of the lift. Different systems have been used hitherto to determine the position. Thus, the use of binary position sensors at each storey is known, which merely signal to the lift that it has reached a storey and can start its deceleration journey. These sensors have the drawback that the position of the lift can no longer be precisely determined, in particular in the event of a power failure and a long reference journey is necessary. It is furthermore known to provide coded signs and photoelectric barriers evaluating the coded signs on the lift car. This does allow only a relatively short reference journey to be necessary after a power failure, but the outlay for applying the coded signs in the lift shaft is relatively large. Finally, the use of rotary encoders is also known, which, in conjunction with a toothed belt, recognize the absolute position of the lift with the aid of the position of the drive unit. However, the outlay for installation, the space requirement and the costs of this device for determining vertical spacings of objects are high. This also applies to generic devices, which, by means of a signal wire and ultrasound pulses, determine the position of a lift car.

Proceeding from this, the present invention is based on the object of providing a device and a method for determining the vertical spacing of objects while carrying out positioning tasks with a vertical travel portion, which, or with which, respectively, a vertical spacing determination can easily take place, even after power failure, with a low outlay for apparatus.

According to a first teaching of the present invention, the object disclosed is achieved by a generic device in that at least a first pressure sensor is arranged on a first object and at least a second pressure sensor is arranged on a second object and evaluation means are provided, the objects changing their vertical position relative to one another while the positioning is being carried out and the vertical travel portion between the positions of the objects being determinable by the evaluation means from the difference of the measured pressure values of the first and the second pressure sensor.

Generally, the air pressure is measured with the pressure sensors, so that the vertical spacing between the two pressure sensors and therewith the spacing of the objects with respect to one another can be determined from the difference of the measured air pressure values by means of the barometric height formula. By forming the difference, in particular the influence of air pressure fluctuations caused by the weather is suppressed, so that a precise determination of the spacing is possible. Moreover, the two pressure sensors are generally subject to the same temperature drift, so that this is also eliminated by forming the difference. In principle, it is also conceivable for the pressure sensors to measure other differential pressures, for example the pressure of a water column if the positioning of the objects takes place under water. In comparison to the known devices for determining vertical positions, for example the control devices of a lift car, a power failure does not lead to a loss of the vertical position of the lift car in the device according to the invention. Rather, the vertical position of the lift car can be precisely determined directly after a power failure with the device according to the invention, as the pressure difference remains the same even after the power failure. In particular, extremely slowly proceeding variations in the vertical spacing of the objects, for example a slow loss of height of the lift car, can also be reliably recognized by the device according to the invention. The device according to the invention is also distinguished by a particularly small space requirement and installation outlay, as only the pressure sensors and the evaluation means have to be mounted.

According to a first embodiment of the present invention, means for temperature measurement are provided on the first and/or on the second pressure sensor. Owing to this measure, the air pressure measurement can be directly corrected by means of the temperature measurement and the accuracy improved.

A particularly simple device for determining the vertical spacing of objects can be achieved in that the first pressure sensor is arranged on a stationary object. The second pressure sensor is then provided on the second object movably arranged relative to the first object. For example, the first pressure sensor can be arranged stationarily in the control of a lift, and the second pressure sensor can be fitted in a lift car, so that the vertical position of the lift car can be determined relative to the first pressure sensor by means of the evaluation means. The second pressure sensor is preferably arranged in the interior of the lift car in order to reduce pressure fluctuations because of air flowing in an out of the lift shaft, for example because of the movement of the lift car.

In order to improve the accuracy of the differential pressure measurement to determine vertical positions, capacitive silicon pressure sensors are preferably provided. These are generally configured as CMOS components, which are, in particular, in a position to measure particularly small pressure differences. The means for temperature measurement are preferably already integrated into the capacitive silicon pressure sensors.

If, according to a next advantageous embodiment, at least one additional position sensor is provided, the measurement signal of which is used additionally by the evaluation means for the determination of the vertical spacing of the objects with respect to one another, the accuracy of the device according to the invention during the determination of the spacing and the dynamics thereof can be further improved.

Preferably, at least one binary position sensor, at least one acceleration sensor, at least one incremental encoder and/or at least one optical travel measurement sensor are provided as additional sensors. For example, the binary position sensor can be used to calibrate the pressure measurement values, if the position of the position sensor is rigidly predetermined. This allows, for example, lifts equipped with binary position sensors to be improved by retrofitting with pressure sensors such that they are ready for use again in a relatively short time even after a power failure and tedious reference journeys are avoided. An acceleration sensor can also calculate a travel length from the acceleration signal of the movement of one of the objects by means of a double integration and can therefore react with higher dynamics to the movements of the objects. The same applies to an incremental encoder or an optical travel measurement sensor. The latter can determine the travel either directly or else indirectly by means of a speed measurement.

The evaluation means preferably allow a self-monitoring to be carried out so the device can produce a state signal or for example a disturbance signal in the case of values of the differential pressure which deviate from the value of the additional sensor. The result of the self-monitoring may also be used, for example, to initiate a correction of the measurement values of the pressure sensors.

It is also conceivable to provide means, which allow a redundant operation of the device in that they carry out a switching over of the spacing determination from a pressure difference measurement using the pressure sensors to the additional sensor and vice versa.

According to a second teaching of the present invention, the object disclosed above is achieved by the use of a device according to the invention for determining a vertical spacing of objects while carrying out positioning tasks in a lift, crane or high shelf system. As already stated above, the device according to the invention offers, in particular in relation to its use in lifts, crane, shelf or handling systems, clear advantages as soon as a power failure occurs, as an absolute vertical spacing determination takes place by means of the differential pressure measurement without a tedious referencing being necessary. For example, as already stated, in lifts, a first pressure sensor may be provided in the lift car and a second pressure sensor may be provided stationarily at the control of the lift, so that the absolute position of the lift car in relation to the pressure sensor at the control of the lift can be determined by means of the differential pressure measurement. The same applies in cranes, in particular for a crane hook or else its shovel. Shelf systems and handling systems frequently have lift-like means for positioning and have to fulfill similar positioning tasks, so that the use of the device according to the invention is also advantageous here. The device according to the invention ensures, in the technical areas mentioned but also in other areas in which positioning tasks with a vertical travel portion are necessary, that a determination of the vertical spacings of objects, that is reliable in the event of a power failure, is made possible with a low outlay for apparatus. At the same time, the space requirement and the outlay for installation are particularly low.

According to a third teaching of the present invention, the object disclosed above is achieved in terms of the method in that a pressure sensor is provided in each case on a first object and on a second object and the vertical spacing between the two positions is determined by evaluation means by means of a differential pressure measurement. As already stated, using the method according to the invention, the vertical spacing of the objects with respect to one another can be easily determined in a manner that is reliable in the event of a power failure.

In order to improve the accuracy and the dynamics of the determination of vertical spacings according to the invention, in addition, a measurement signal of at least one binary position sensor, at least one acceleration sensor, at least one incremental encoder and/or an optical travel measurement sensor are used to correct the spacing determination. The conventional sensors mentioned for determining vertical positions generally have higher dynamics and better accuracy in relation to the vertical spacing determination. However, only in combination with the differential pressure measurement do these allow a particularly convenient, space-saving determination of the vertical spacing of objects, that is reliable in the event of a power failure, as, because of the pressure difference measurement, the position of the objects relative to one another is also known after the power failure.

A further increase in the measurement reliability is achieved according to a further embodiment of the method in that the evaluation means, using the additional measurement signal, carry out a self-monitoring of the sensor and/or of the total device to determine the vertical spacing of objects. The self-monitoring may take place periodically and/or dependent on the additional measurement signal.

There are now a large number of possibilities for improving and configuring the device according to the invention and the method according to the invention. For this purpose, reference is made to the description of an embodiment in conjunction with the drawing. The drawing shows, in a schematic view, an embodiment of a device according to the invention for determining vertical spacings of objects using the example of a lift.

FIG. 1 shows a lift shaft 1 with a lift car 2 contained therein, the vertical position of which lift car is changed by a drive 3. To determine the vertical position of the lift car 2 in the lift shaft, a first pressure sensor 4 is now provided, for example on the ceiling of the lift shaft and a second pressure sensor 5 is provided in the lift car. The pressure measurement values of the pressure sensors 4, 5 are subtracted from one another by means of evaluation means, which are not shown. By means of the differential pressure, the spacing can be determined from the barometric relation of the air pressure difference between the vertical position of the first pressure sensor 4 and the pressure sensor 5 arranged in the lift car 2. The pressure sensors are generally designed as CMOS components and may have a resolution of up to 8 cm in the vertical position determination. In the embodiment shown in FIG. 1, on the one hand binary position sensors 6 and, on the other hand, an optical travel measurement sensor 7, are provided to improve the accuracy of the positioning of the lift car. The binary position sensors 6 emit a control signal as soon as the lift car reaches the level of the position sensor 6. The binary position sensors may be implemented by photoelectric barriers or else by proximity sensors.

The signal of the binary position sensor 6 and, in particular of an optical travel measurement sensor 7 may be used to carry out a self-monitoring, using the evaluation means, which are not shown, in order to increase the measurement reliability in the differential pressure measurement. It is also possible to switch over between the signals used for the spacing determination, to carry out the redundancy.

In the event of a power failure, the position of the lift car 2 within the lift shaft 1 can quickly be easily determined again as the spacing, for example, from the ceiling of the lift shaft 1 can easily be determined by the difference measurement between the pressure sensors 4 and 5. Because of the position information after a power failure the lift car can be moved in a controlled manner by means of the drive 3 up to the next position sensor 6 to reference the precise position of the lift. A long-lasting reference journey of the lift is, to this extent, dispensed with. Here, for the sake of simplicity, the position shown in the present embodiment of the first pressure sensor 4 is only shown in the shaft of the lift 1. Generally, this site is not optimal because pressure fluctuations may occur in the lift shaft 1 because of air flowing in and out. The pressure sensor 4 is therefore preferably provided close to the lift control, but at sites not affected by pressure fluctuations.

If no binary position sensors 6 are provided, a precise position of the lift car 2 can also be determined with an optical travel measurement sensor 7 which measures the movement of the lift car relative to the lift shaft wall. The optical travel measurement sensor 7 can improve the accuracy and the dynamics of the determination of the vertical position of the lift car 2 on the basis of the pressure difference measurement, the latter measuring, for example, the movement of the lift car 2 relative to a guide rail of the lift, which is not shown in the FIGURE. For this purpose, markings applied to the guide rail and/or features of the surface of the guide rail itself may be used to determine travel lengths. An improvement in the dynamics of the measurement and the accuracy of the spacing determination may, however, also be provided with an incremental encoder provided, for example, in the drive 3 of the lift and not shown in the FIGURE, in conjunction with the spacing determination by the pressure difference measurement between the two pressure sensors 4, 5.

The invention claimed is:

1. A device for determining the vertical spacing of objects while carrying out positioning tasks with a vertical travel portion, the device comprising:
   at least a first pressure sensor arranged on a first object and at least a second pressure sensor is arranged on a second object, the two pressure sensors being configured to measure environmental pressures;
   an evaluation means; and
   at least one additional position sensor, the measuring signal of which is additionally used by the evaluation means to determine the vertical spacing of the objects relative to one another,
   wherein the objects change their vertical position relative to one another while the positioning is being carried out and the vertical travel portion between the positions of the objects are determinable by the evaluation means from the difference of the measured pressure values of the first and second pressure sensor, and
   wherein the at least one additional position sensor does not include an applied coded sign.

2. The device according to claim 1, wherein means for temperature measurement are provided at the first and/or at the second pressure sensor.

3. The device according to claim 1, wherein the first pressure sensor is arranged on a stationary object.

4. The device according to claim 1, wherein the first pressure sensor and the second pressure sensor are capacitive silicon pressure sensors.

5. The device according to claim 1, wherein the at least one additional position sensor is at least one binary position sensor, at least one acceleration sensor, at least one incremental encoder and/or at least one optical travel measurement sensor.

6. The device according to claim 1, wherein the evaluation means allow a self-monitoring to be carried out.

7. A method of using the device according to claim 1, in a lift, a crane, a shelf or handling systems, the method comprising:
   providing the device according to claim 1; and
   using the device in the lift, the crane, the shelf or the handling systems.

8. A method for determining the vertical spacing of objects while carrying out positioning tasks with a vertical travel portion using the device according to claim 1, the method comprising:
   providing the first pressure sensor on the first object;
   providing the second pressure sensor on the second object;
   providing the evaluation means; and
   providing the at least one additional position sensor;
   wherein the two pressure sensors are configured to measure the environmental pressures,
   wherein the vertical spacing between the two positions is determined by the evaluation means by means of the differential pressure measurement, and
   wherein the evaluation means use the measurement signal of the at least one additional position sensor to determine the vertical spacing of the objects relative to one another.

9. The method according to claim 8, wherein at least one measurement signal of the at least one additional positional sensor is additionally used to correct the determination of the spacing, wherein the at least one additional positional sensor is at least one binary position sensor, at least one acceleration sensor, at least one incremental encoder and/or one optical travel measurement sensor.

10. The method according to claim 9, wherein the evaluation means, using the additional measurement signal, carry out a self-monitoring of the sensors and/or of the total device to determine the vertical spacing of objects.

11. The method according to claim 8, wherein the environmental pressures is an air pressure or a water pressure.

12. The device according to claim 1, wherein the environmental pressures is an air pressure or a water pressure.

* * * * *